United States Patent
Krueger et al.

(10) Patent No.: US 10,315,349 B2
(45) Date of Patent: Jun. 11, 2019

(54) SEALING ASSEMBLY FOR A VEHICLE AND METHOD OF MANUFACTURING A SEALING ASSEMBLY

(71) Applicant: Henniges Automotive Sealing Systems North America, Inc., Wilmington, DE (US)

(72) Inventors: Robert M. B. Krueger, Grosse Ile, MI (US); Christian Heintz, Ginsheim-Gustavsburg (DE); Dirk Cholewa, Mönchengladbach (DE)

(73) Assignee: Henniges Automotive Sealing Systems North America, Inc., Dover, DE (US)

( * ) Notice: Subject to any disclaimer, the term of this patent is extended or adjusted under 35 U.S.C. 154(b) by 0 days.

(21) Appl. No.: 15/115,941

(22) PCT Filed: Feb. 9, 2015

(86) PCT No.: PCT/US2015/015038
§ 371 (c)(1),
(2) Date: Aug. 2, 2016

(87) PCT Pub. No.: WO2015/120395
PCT Pub. Date: Aug. 13, 2015

(65) Prior Publication Data
US 2017/0113393 A1    Apr. 27, 2017

Related U.S. Application Data

(60) Provisional application No. 61/937,120, filed on Feb. 7, 2014.

(51) Int. Cl.
*B60J 10/16* (2016.01)
*B29C 48/21* (2019.01)
(Continued)

(52) U.S. Cl.
CPC .......... *B29C 48/21* (2019.02); *B29C 48/0021* (2019.02); *B29C 48/022* (2019.02);
(Continued)

(58) Field of Classification Search
CPC ... B60J 10/16; B60J 10/17; B60J 10/18; B60J 10/78; B29C 48/21
See application file for complete search history.

(56) References Cited

U.S. PATENT DOCUMENTS

| 3,659,896 A | 5/1972 | Smith et al. |
| 4,291,076 A | 9/1981 | Katoh |

(Continued)

FOREIGN PATENT DOCUMENTS

| CN | 202213472 U | 5/2012 |
| CN | 202389175 U | 8/2012 |

(Continued)

OTHER PUBLICATIONS

English language abstract and computer-generated English language translation for CN202764671U extracted from espacenet.com database on Oct. 16, 2017, 5 pages.

(Continued)

*Primary Examiner* — Eugene G Byrd
(74) *Attorney, Agent, or Firm* — Howard & Howard Attorneys PLLC

(57) ABSTRACT

A sealing assembly for a vehicle comprises a sealing body extruded from an elastomeric material formed from an ethylene propylene diene monomer and having a base and first and second legs spaced from one another extending from the base. The base and the legs define an interior surface and a first channel for receiving a panel, and further define an exterior surface opposite the interior surface. The sealing body defines an overmold region opposite the first channel extending along a portion of the exterior surface of (Continued)

the sealing body. The sealing assembly further comprises a bonding layer of a first thermoplastic vulcanizate co-extruded onto the overmold region of the sealing body, and a molded layer of a second thermoplastic vulcanizate molded onto the bonding layer with the molded layer defining a second channel for receiving a fixed window of the vehicle. Also disclosed is a method for manufacturing a sealing assembly.

21 Claims, 4 Drawing Sheets

(51) Int. Cl.
  B29C 48/03 (2019.01)
  B29C 48/00 (2019.01)
  B29C 48/22 (2019.01)
  B60J 10/78 (2016.01)
  B60J 10/17 (2016.01)
  B60J 10/18 (2016.01)
  B29K 21/00 (2006.01)
  B29K 23/00 (2006.01)
  B29L 31/26 (2006.01)
  B29L 31/30 (2006.01)

(52) U.S. Cl.
  CPC .............. *B29C 48/03* (2019.02); *B29C 48/22* (2019.02); *B60J 10/16* (2016.02); *B60J 10/17* (2016.02); *B60J 10/18* (2016.02); *B60J 10/78* (2016.02); *B29K 2021/006* (2013.01); *B29K 2023/16* (2013.01); *B29K 2995/0082* (2013.01); *B29L 2031/26* (2013.01); *B29L 2031/3005* (2013.01)

(56) References Cited

U.S. PATENT DOCUMENTS

| | | | |
|---|---|---|---|
| 4,562,676 A * | 1/1986 | Kruschwitz | B60J 10/365 428/31 |
| 4,843,763 A * | 7/1989 | Mesnel | B60J 10/79 156/244.19 |
| 4,970,828 A | 11/1990 | Mesnel et al. | |
| 5,072,546 A * | 12/1991 | Ogawa | B60J 10/24 49/475.1 |
| 5,085,005 A | 2/1992 | Yasukawa et al. | |
| 5,123,693 A | 6/1992 | Karashima et al. | |
| 5,143,772 A | 9/1992 | Iwasa | |
| 5,174,066 A | 12/1992 | Dupuy | |
| 5,182,141 A | 1/1993 | Borys et al. | |
| 5,261,721 A | 11/1993 | Conger et al. | |
| 5,317,835 A | 6/1994 | DuPuy et al. | |
| 5,352,496 A | 10/1994 | Jackson | |
| 5,411,785 A | 5/1995 | Cook | |
| 5,415,822 A | 5/1995 | Cook | |
| 5,437,124 A * | 8/1995 | Ahlfeld | B60J 10/16 49/479.1 |
| 5,538,317 A * | 7/1996 | Brocke | B60J 10/82 296/216.09 |
| 5,564,249 A | 10/1996 | Borys et al. | |
| 5,618,593 A | 4/1997 | Belser et al. | |
| 5,628,150 A | 5/1997 | Mesnel | |
| 5,686,165 A | 11/1997 | Cook | |
| 5,736,215 A | 4/1998 | Buchholz et al. | |
| 5,806,914 A | 9/1998 | Okada | |
| 5,846,463 A | 12/1998 | Keeney et al. | |
| 6,023,888 A * | 2/2000 | Dover | B60J 10/79 49/441 |
| 6,106,911 A | 8/2000 | Dupuy | |
| 6,301,834 B1 | 10/2001 | Tyves | |
| 6,514,604 B2 | 2/2003 | Gopalan et al. | |
| 6,652,952 B2 | 11/2003 | Drozd et al. | |
| 6,817,651 B2 | 11/2004 | Carvalho et al. | |
| 6,848,218 B2 | 2/2005 | Langemann | |
| 6,874,281 B2 * | 4/2005 | Fujita | B60J 10/24 296/146.9 |
| 6,896,954 B2 | 5/2005 | Omori et al. | |
| 6,942,278 B2 * | 9/2005 | Shimizu | B62D 25/04 296/146.9 |
| 6,945,540 B2 | 9/2005 | Bormann et al. | |
| 7,531,118 B2 | 5/2009 | Ellis | |
| 7,543,881 B2 | 6/2009 | Okajima et al. | |
| 7,608,316 B2 | 10/2009 | Okajima et al. | |
| 7,763,197 B2 | 7/2010 | Ellis et al. | |
| 8,051,606 B2 | 11/2011 | Maase et al. | |
| 8,166,708 B2 | 5/2012 | Ellis et al. | |
| 8,225,554 B2 | 7/2012 | Nozaki | |
| 8,328,975 B2 * | 12/2012 | Ruppert | B29C 45/14377 156/245 |
| 8,434,267 B2 * | 5/2013 | Bocutto | B60J 10/235 296/93 |
| 8,661,736 B2 | 3/2014 | Roll et al. | |
| 9,027,284 B2 | 5/2015 | Murree et al. | |
| 2001/0033927 A1 * | 10/2001 | Omori | B32B 25/08 428/317.1 |
| 2002/0096800 A1 | 7/2002 | Keeney et al. | |
| 2005/0084629 A1 | 4/2005 | Gopalan | |
| 2005/0112301 A1 | 5/2005 | Omori et al. | |
| 2005/0155293 A1 | 7/2005 | Dron | |
| 2005/0269741 A1 | 12/2005 | Rigby et al. | |
| 2006/0000181 A1 | 1/2006 | Zwolinski et al. | |
| 2006/0086053 A1 | 4/2006 | Ellis | |
| 2006/0150523 A1 | 7/2006 | Matthies | |
| 2006/0156632 A1 | 7/2006 | Ruppert et al. | |
| 2006/0279046 A1 | 12/2006 | Vogt et al. | |
| 2008/0224501 A1 | 9/2008 | Zimmer et al. | |
| 2008/0238134 A1 | 10/2008 | Guellec | |
| 2008/0302022 A1 | 12/2008 | Knight et al. | |
| 2010/0095600 A1 | 4/2010 | Gagnon et al. | |
| 2010/0186301 A1 | 7/2010 | Drozd et al. | |
| 2011/0061307 A1 | 3/2011 | Braeuherr | |
| 2011/0109009 A1 | 5/2011 | Guellec | |
| 2011/0143113 A1 | 6/2011 | Hatta et al. | |
| 2012/0297726 A1 | 11/2012 | Ellis et al. | |
| 2013/0026717 A1 | 1/2013 | MacDonald et al. | |
| 2013/0031842 A1 | 2/2013 | Murree et al. | |
| 2013/0093141 A1 | 4/2013 | Guellec | |
| 2013/0219799 A1 | 8/2013 | Takeuchi et al. | |
| 2014/0145374 A1 | 5/2014 | Altonen et al. | |
| 2015/0273990 A1 | 10/2015 | Adachi et al. | |

FOREIGN PATENT DOCUMENTS

| | | |
|---|---|---|
| CN | 102700386 A | 10/2012 |
| CN | 202764671 U | 3/2013 |
| CN | 202806319 U | 3/2013 |
| DE | 29720053 U1 | 3/1999 |
| DE | 10159251 C1 | 4/2003 |
| DE | 10 2006 060 390 B3 | 2/2008 |
| DE | 102010034340 A1 | 4/2012 |
| DE | 102010001468 B4 | 1/2014 |
| DE | 102014001694 A1 | 10/2014 |
| EP | 0 385 028 A1 | 9/1990 |
| EP | 0475728 A2 | 3/1992 |
| EP | 1535783 A1 | 6/2005 |
| GB | 2 393 752 A | 4/2004 |
| WO | 2013040573 A1 | 3/2013 |
| WO | 2015120395 A1 | 8/2015 |

OTHER PUBLICATIONS

English language abstract and computer-generated English language translation for DE10159251C1 extracted from espacenet.com database on Oct. 16, 2017, 10 pages.

English language abstract for EP1535783A1 extracted from espacenet.com database on Oct. 16, 2017, 1 page.

Supplementary European Search Report for EP15745925 dated Oct. 4, 2017, 2 pages.

(56) References Cited

OTHER PUBLICATIONS

English language abstract and computer-generated English language translation for CN 202213472U extracted from espacenet.com database on Jun. 19, 2017, 6 pages.
English language abstract and computer-generated English language translation for CN 202389175U extracted from espacenet.com database on Jun. 19, 2017, 5 pages.
English language abstract and computer-generated English language translation for CN 102700386A extracted from espacenet.com database on Jun. 19, 2017, 11 pages.
English language abstract and computer-generated English language translation for CN 202806319U extracted from espacenet.com database on Jun. 19, 2017, 5 pages.
International Search Report for Application No. PCT/US15/15038 dated May 15, 2015, 2 pages.
Certified English language translation for DE 10 2006 060 390 provided by Language Arts and Science on Feb. 3, 2015, 9 pages.
European Search Report for European Application No. EP 14168411.8 dated Dec. 19, 2014, 3 pages.
English language abstract and computer-generated English language translation for DE102010001468B4 extracted from espacenet.com database on Feb. 5, 2018, 12 pages.
Computer-generated English language abstract and computer-generated English language translation for DE102014001694A1 extracted from espacenet.com database on Feb. 5, 2018, 29 pages.
Lord Corporation, "Lord Technical Data—Chemlok 487A/B Adhesive" 2012, 4 pages.
Lord Corporation, "Lord Technical Data—Chemlok 489/456 Adhesive" 2012, 2 pages.
U.S. Appl. No. 62/466,733, filed Mar. 3, 2017, 20 pages.
English language abstract and computer-generated English language translation for DE102010034340A1 extracted from espacenet.com database on Jan. 18, 2018, 12 pages.
International Search Report for Application No. PCT/US2018/020867 dated Jul. 26, 2018, 2 pages.

\* cited by examiner

SEALING ASSEMBLY FOR A VEHICLE AND METHOD OF MANUFACTURING A SEALING ASSEMBLY

CROSS REFERENCE TO RELATED APPLICATIONS

The subject application claims priority to and all the benefits of International Patent Application Serial No. PCT/US2015/015038, filed. Feb 9, 2015, which claims priority to and all the benefits of U.S. Provisional Application Ser. No. 61/937,120, filed Feb. 7, 2014.The contents of International Patent Application Serial No. PCT/US2015/015038 and U.S. Provisional Application Ser. No. 61/937,120 are expressly incorporated herein in their entirety.

FIELD OF THE INVENTION

The present disclosure relates generally to a sealing assembly for a vehicle and to a method of manufacturing a sealing assembly.

BACKGROUND

Motor vehicles typically have windows that provide visibility into and out of a passenger compartment of the vehicle. One or more of the windows may be moveable relative to the vehicle body (such as a vertical moving window of a vehicle door, etc.), while one or more of the windows may be stationary or fixed (such as a quarter window on the vehicle door, etc.).

Sealing assemblies are typically disposed between a fixed and/or moveable window and, for example, a vehicle door for forming a seal at an interface between the window and the vehicle door. Many sealing assemblies that are currently available are formed by a thermoplastic vulcanizate (TPV) and/or an ethylene propylene diene monomer (EPDM) rubber. Combining these materials in a single sealing assembly is difficult, because it is difficult to bond TPV and EPDM rubber.

Accordingly, the present invention aims at solving the problem(s) of the prior art identified above.

SUMMARY

A sealing assembly for a vehicle having a fixed window and a panel comprises a sealing body extruded from an elastomeric material formed from an ethylene propylene diene monomer (EPDM). The sealing body has a base and first and second legs spaced from one another extending from the base. The base and the first and second legs define an interior surface and a first channel for receiving the panel within the first channel. The base and the first and second legs further define an exterior surface opposite the interior surface. The sealing body defines an overmold region opposite the first channel extending along a portion of the exterior surface of the sealing body. The sealing assembly further comprises a bonding layer of a first thermoplastic vulcanizate (TPV) co-extruded onto the overmold region of the sealing body. The sealing assembly further comprises a molded layer formed of a thermoplastic vulcanizate (TPV) molded onto the bonding layer with the molded layer defining a second channel for receiving the fixed window of the vehicle within the second channel.

A method of manufacturing a sealing assembly for a vehicle having a fixed window and a panel comprises the step of extruding an elastomeric material formed from an ethylene propylene diene monomer (EPDM) to form a sealing body having a base and first and second legs spaced from one another extending from the base. The base and the first and second legs define an interior surface and a first channel for receiving the panel within the first channel. The base and the first and second legs further define an exterior surface opposite the interior surface. The sealing body defines an overmold region opposite the first channel extending along a portion of the exterior surface of the sealing body. The method further comprises co-extruding a thermoplastic vulcanizate (TPV) onto the overmold region of the sealing body to form a bonding layer. The method further comprises molding a thermoplastic vulcanizate (TPV) onto the bonding layer to form a molded layer with the molded layer defining a second channel for receiving the fixed window of the vehicle within the second channel.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and that the drawings are not necessarily drawn to scale.

DETAILED DESCRIPTION

Figure 1:
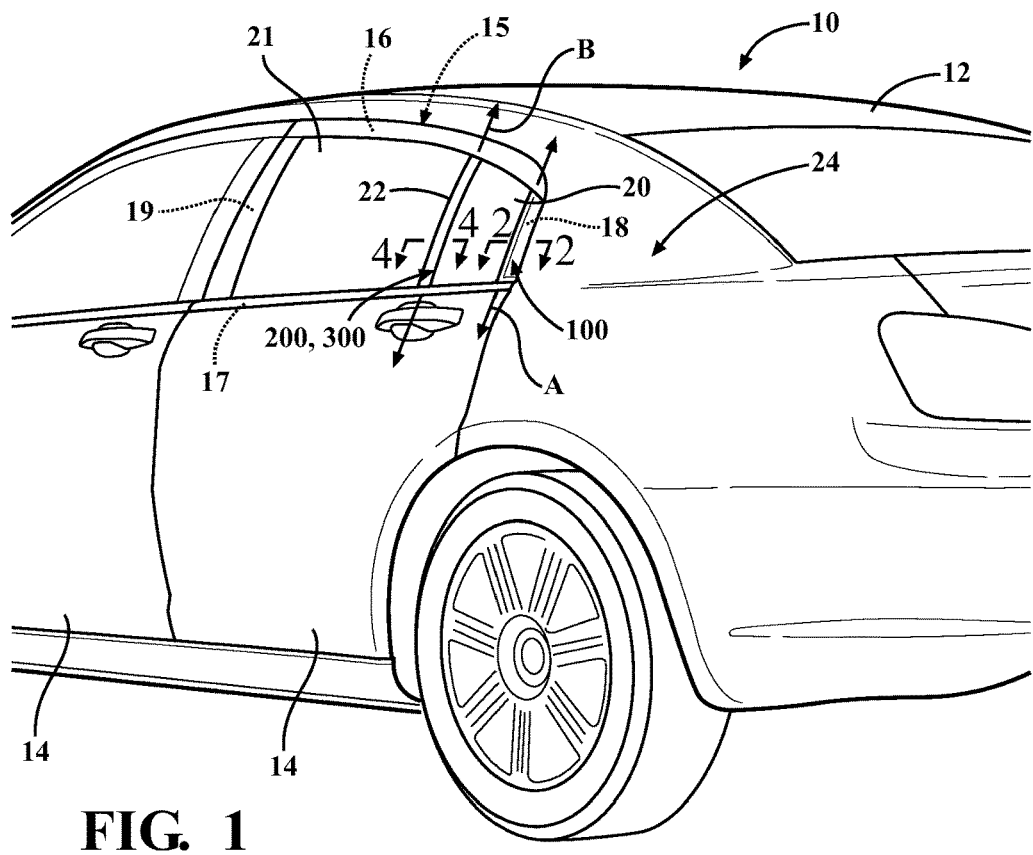
FIG. 1 is a perspective view of a portion of an exterior of a vehicle including a sealing assembly according to various embodiments of the present disclosure.

Referring now to the figures, wherein like numerals indicate corresponding parts throughout the several views, embodiments of the sealing assembly 100, 200, 300 are shown in the figures and are described in detail below. FIG. 1 depicts a portion of an exterior of a vehicle 10 having a vehicle body 12 and a plurality of doors 14 coupled to the vehicle body 12. As shown, the vehicle door 14 includes a window frame 15 having an upper frame member 16, a lower frame member 17, and first 18 and second 19 side frame members. The window frame 15 supports a fixed window 20 and a moveable window 21 with a divider 22 separating the windows 20, 21. For example, the upper frame member 16, the lower frame member 17, the first side frame member 18, and the divider 22 collectively support the fixed window 20. Said differently, the fixed window 20 is fixed within the window frame 15 by the frame members 16, 17, 18 and the divider 22. The moveable window 21 is supported at least by the side frame member 19 and the divider 22. For example, the moveable window 21 is slidably supported by the side frame member 19 and the divider 22 when the moveable window 21 is in an open or partially open position, and the moveable window 21 is supported by the upper frame member 16, the side frame member 19, and the divider 22 when the moveable window 21 is in the closed position. Additionally, the window frame 15 includes a flange 23 (as shown at least in FIG. 2 relative to the first side frame member 18), which generally follows the contour of the vehicle door 14.

In an example, the vehicle body 12 further includes at least one vehicle panel. As shown, the vehicle body 12 includes a rear panel 24 defining at least a portion of the rear exterior of the vehicle 10. It is to be understood that the vehicle body 12 may include additional vehicle panels, such as side panels, front panels, roof panels, good panels, deck panels, etc.

Figure 2:
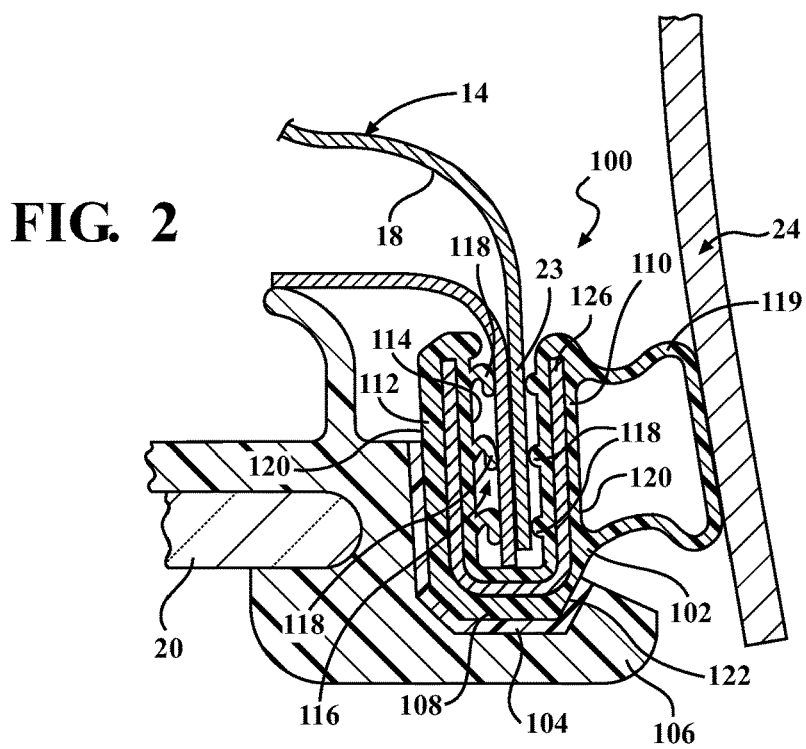
FIG. 2 is a cross-sectional view of the sealing assembly taken along line 2-2 in FIG. 1.
Figure 3:
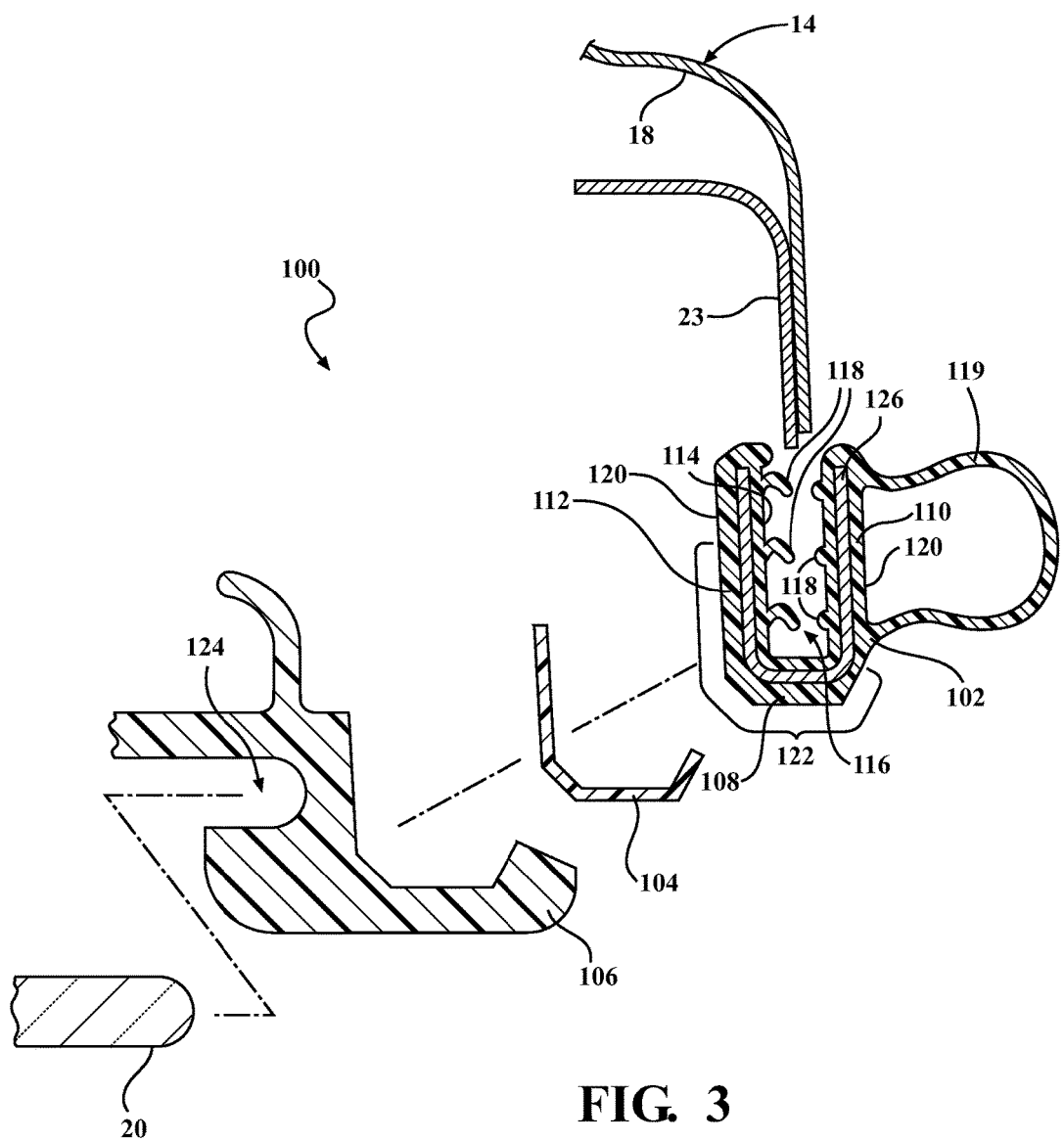
FIG. 3 is an exploded view of the sealing assembly of FIG. 2.

An embodiment of the sealing assembly 100 is described below with reference to FIGS. 2 and 3. The sealing assembly 100 is positioned along the first side frame member 18. In this embodiment, the sealing assembly 100 forms a seal between the first side frame member 18 and the rear panel 24. The sealing assembly 100 also forms a seal between the fixed window 20 and the first side frame member 18.

The sealing assembly 100 comprises a sealing body 102 extruded from an elastomeric material formed from an ethylene propylene diene monomer (EPDM), a bonding layer 104 of a first thermoplastic vulcanizate (TPV) co-extruded onto the sealing body 102, and a molded layer 106 of a second thermoplastic vulcanizate (TPV) molded onto the bonding layer 104. The sealing assembly 100 extends along a longitudinal axis A (as shown in FIG. 1). Typically, the longitudinal axis A is linear. However, the longitudinal axis A may be nonlinear in instances where the sealing assembly 100 bends or flexes.

As shown, the sealing body 102 has a base 108 and first 110 and second 112 legs spaced from one another extending from the base 108. In an example, the first 110 and second 112 legs are substantially parallel to one another when the first 110 and second 112 legs are equally or almost equally spaced from one another along the longitudinal axis A of the sealing body 102. The first 110 and second 112 legs are also transverse to the base 108. In an example, the first 110 and second 112 legs are substantially parallel to one another when the first leg 110 The base 108, the first leg 110, and the second leg 112 define an interior surface 114 and a first channel 116 for receiving a panel of the vehicle 10, such as a flange 23 of the vehicle door 14, within the first channel 116. In and example, the first channel 116 is substantially "U" shaped and extends along the longitudinal axis A. It is to be understood, however, that the first channel 116 may alternatively have any suitable shape.

The sealing body 102 further comprises at least one sealing lip 118 defined in the interior surface 114 of each of the first 110 and second 112 legs. Further, each of the sealing lips 118 extends toward the first channel 116. As shown, three sealing lips 118 are defined in the interior surface 114 of the first leg 110, and three sealing lips 118 are defined in the interior surface 114 of the second leg 112. It is to be understood that the interior surface 114 of each of the first 110 and second 112 legs may have any number of sealing lips 118. In an example, each of the first 110 and second 112 legs may have one, two, three, or more sealing lips 118. Additionally, the first leg 110 may have more sealing lips 118 than the second leg 112. For example, the first leg 110 may have two sealing lips 118 while the second leg 112 may have one sealing lip 118. Alternatively, the second leg 112 may have more sealing lips 118 than the first leg 110. For example, the first leg 110 may have one sealing lip 118 while the second leg 112 may have two sealing lips 118. The sealing lips 118 can move or flex to allow the flange 23 of the vehicle door 14 to be received within the first channel 116. The sealing lips 118 are also biased toward the first channel 116 so that, when the flange 23 is received within the first channel 116, the sealing lips 118 form a seal at least between the flange 23 and the fixed window 20.

In an example, the sealing body 102 further comprises a sealing bulb 119 defined in the exterior surface 120 of the first leg 110 opposite the first channel 116. The sealing bulb 119 extends outwardly toward the rear panel 24 for purposes of forming a seal between the rear vehicle panel 24 and the vehicle door 14 when the door 14 is closed. In an example, the sealing bulb 119 may be a dense bulb including EPDM rubber. In another example, the sealing bulb 119 may be a bulb including sponge-like material. Instead of a bulb, the sealing body 102 may have a lip defined in the exterior surface 120 of the first leg 110 opposite the first channel 116. In an example, the lip may include a sponge-like material.

The base 108 and the first 110 and second 112 legs of the sealing body 102 further define an exterior surface 120 opposite the interior surface 114. The exterior surface 120 is also opposite the first channel 116. Further, the sealing body 102 defines an overmold region 122 opposite the first channel 116 extending along a portion of the exterior surface 120 of the sealing body 102. The overmold region 122 is an area of the exterior surface 120 of the sealing body 102 to which the molded layer 106 is coupled to the sealing body 102. In an example, the overmold region 122 is a predefined area of the exterior surface 120 of the sealing body 102 to which the molded layer 106 is coupled to the sealing body 102. In the present embodiment, the overmold region 122 extends along the base 108 and a portion of the second leg 112 of the sealing body 102. It is to be understood that the sealing body 102 may define the overmold region 122 opposite the first channel 116 along any desired portion of the exterior surface 120 of the sealing body 102. In an example, the overmold region 122 may extend along the base 108 alone. In another example, the overmold region 122 may extend along the base 108 and a portion of the first leg 110 of the sealing body 102. In yet another example, the overmold region 122 may extend along the base 108 and the entire length of the first leg 110 and/or the second leg 112.

As previously mentioned, the sealing body 102 is extruded from an elastomeric material of the sealing body 102 formed from an ethylene propylene diene monomer (EPDM), e.g., EPDM rubber. In an example, the sealing body 102 is extruded from only the elastomeric material formed from EPDM. In another example, the sealing body 102 is extruded from a composition including the elastomeric material and a plasticizer, a filler, and/or various other components or additives. It is to be understood that the sealing body 102 may be extruded from an elastomeric material formed from a monomer other than EPDM. For example, the sealing body may be extruded from styrene butadiene rubber (SBR), natural rubber, neoprene, and/or combinations thereof. It is to be further understood that the sealing body 102 may be extruded from other materials, such as other thermoplastic or thermosetting materials, which are not specifically described herein.

The bonding layer 104 is of a first thermoplastic vulcanizate (TPV) co-extruded onto the overmold region 122 of the sealing body 102. The bonding layer 104 is used in the sealing assembly 100 to facilitate coupling of the molded layer 106 to the sealing body 102, and may be referred to as a tie layer. To this end, the bonding layer 104 need only be disposed on the overmold region 122.

Thermoplastic vulcanizates are thermoplastic elastomers (TPE) having both thermoplastic and elastomeric properties. In an example, the first TPV of the bonding layer 104 may be selected from any suitable extrusion-grade TPV, non-limiting examples of which include TPVs of the SANTO- PRENE® 121, 201, 691, 8291, and 9101 families available from Exxon-Mobil Corporation (Irving, Tex.). Non-limiting examples of suitable extrusion-grade TPVs that may be used as the first TPV of the bonding layer 104 include SANTOPRENE® 121-50E500, SANTOPRENE® 121-58W175, SANTOPRENE® 121-67W175, SANTOPRENE® 121-73W175, SANTOPRENE® 121-80W175, SANTOPRENE® 123-52W242, SANTOPRENE® 201-67W171, SANTOPRENE® 691-65W175, SANTOPRENE® 691-73W175, SANTOPRENE® 8291-85TL, and SANTOPRENE® 9101-80E, all of which are available from Exxon-Mobil Corporation (Irving, Tex.).

In an example, the first TPV may be selected from any suitable TPV that is considered an extrusion-grade TPV and a molding-grade TPV, non-limiting examples of which include various TPVs of the GEOLAST® 701 and 703 families and various TPVs of the SANTOPRENE® 101, 103, 121, 123, 201, 203, 241, 251, 291, 8191, 8201, and 8211, all of which are available from Exxon-Mobil Corporation (Irving, Tex.). Non-limiting examples of suitable extrusion-grade and molding-grade TPVs that may be used as the first TPV of the bonding layer 104 include GEOLAST® 701-70, GEOLAST® 701-80W183, GEOLAST® 701-87W182, GEOLAST® 703-45, SANTOPRENE® 101-45W255, SANTOPRENE® 101-55, SANTOPRENE® 101-55W255, SANTOPRENE® 101-64, SANTOPRENE® 101-73, SANTOPRENE® 101-80, SANTOPRENE® 101-87, SANTOPRENE® 103-40, SANTOPRENE® 103-50, SANTOPRENE® 121-80, SANTOPRENE® 121-87, SANTOPRENE® 123-40, SANTOPRENE® 123-50W175, SANTOPRENE® 201-55, SANTOPRENE® 201-55W255, SANTOPRENE® 201-64, SANTOPRENE® 201-73, SANTOPRENE® 201-80, SANTOPRENE® 201-87, SANTOPRENE® 203-40, SANTOPRENE® 203-50, SANTOPRENE® 241-55, SANTOPRENE® 241-64, SANTOPRENE® 241-73W236, SANTOPRENE® 241-80W236, SANTOPRENE® 251-70W232, SANTOPRENE® 251-80W232, SANTOPRENE® 251-85W232, SANTOPRENE® 251-92W232, SANTOPRENE® 291-60B150, SANTOPRENE® 291-75B150, SANTOPRENE® 8191-55B100, SANTOPRENE® 8201-60, SANTOPRENE® 8201-70, SANTOPRENE® 8201-80, SANTOPRENE® 8201-90, and SANTOPRENE® 8211-55B100, all of which are available from Exxon-Mobil Corporation (Irving, Tex.).

In yet another example, the first TPV may be a combination of a thermoplastic material and an elastomer. Non-limiting examples of elastomers that may be included with the first TPV include elastomeric materials formed from EPDM, styrene butadiene rubber, natural rubber, neoprene, and/or combinations thereof. Non-limiting examples of thermoplastic materials include acrylonitrile butadiene styrenes, acrylics, celluloids, cellulose acetates, cycloolefin copolymers, ethylene-vinyl acetates, ethylene vinyl alcohols, fluoropolymers, ionomers, liquid crystal polymers, polyacetals, polyacrylates, polyacrylonitriles, polyamides, polyamide-imides, polyaryletherketones, polybutadienes, polybutylenes, polybutylene terephthalates, polycaprolactones, polychlorotrifluoroethylenes, polyethylene terephthalates, polycyclohexylene dimethylene terephthalates, polycarbonates, polyhydroxyalkanoates, polyketones, polyesters, polyethylenes, polyetheretherketones, polyetherimides, polysulfones, polyethylenechlorinates, polyimides, polylactic acids, polymethylpentenes, polyphenylene oxides, polyphenylene sulfides, polyphthalamides, polypropylenes, polystyrenes, polysulfones, polytrimethylene terephthalates, polyurethanes, polyvinyl acetates, polyvinyl chlorides, polyvinylidene chlorides, styrene-acrylonitriles, and/or combinations thereof. The first TPV may include greater than 5, alternatively greater than 10, alternatively greater than 15 parts by weight of the thermoplastic material based on 100 parts by weight of the whole TPV. Additionally, the first TPV can include a plasticizer, a filler, and/or various other components or additives.

As previously mentioned, the bonding layer 104 is co-extruded onto the overmold region 122 of the sealing body 102. For example, the sealing body 102 is formed by extruding the elastomeric material in an extruder, typically at an extrusion temperature suitable for melting and extruding EPDM rubber. In an example, the extrusion temperature for extruding EPDM rubber is of from 50 to 150° C., and more particularly from 65 to 105° C. (e.g., from 150 to 220° F.). EPDM rubber often forms an oil which remains on the surface of the EPDM rubber. Typically, the oil on the surface of the EPDM rubber prevents suitable bonding to other materials, such as thermoplastic vulcanizates. By extruding the EPDM rubber at a high extrusion temperature (such as an extrusion temperature of from 50 to 150° C.), it was unexpectedly found that the EPDM rubber does not form the oil and can form chemical bonds with another elastomeric material such as a thermoplastic vulcanizate. To chemically bond the first TPV to the EPDM rubber of the sealing body 102 and thereby form the bonding layer 104 on the sealing body 102, the first TPV may be co-extruded onto the extruded sealing body 102 while the extruded sealing body 102 is still inside the extruder and is still hot. In an example, the first TPV is co-extruded onto the sealing body 102 (particularly onto the overmold region 122 of the sealing body 102) in the extruder, typically at an extrusion temperature of from 150 to 225° C., and more particularly from 185 to 195° F. (e.g., from 365 to 380° F.).

In addition to the chemical bond, the bonding layer 104 may also form a mechanical bond with the sealing body 102. For example, while the first TPV is in the molten state during co-extrusion, the molten first TPV may merge with the molten EPDM rubber of the sealing body 102 at the interface between the bonding layer 104 and the sealing body 102. After the materials merge, and after the bonding layer 104 and the sealing body 102 are removed from the extruder and cooled, the first TPV of the bonding layer 104 may also be mechanically held and/or fastened to the EPDM rubber of the sealing body 102.

As previously mentioned, the sealing assembly 100 further comprises the molded layer 106 of a second thermoplastic vulcanizate (TPV) molded onto the bonding layer 104. As shown, the molded layer 106 defines a second channel 124 for receiving the fixed window 20 of the vehicle 10 within the second channel 124. As shown, at least a portion of the first channel 116 is substantially perpendicular to the second channel 124. In an example, the first channel 116 is substantially perpendicular to the second channel 124 when the first channel 116 is positioned at a 90° angle relative to the second channel 124, or the first channel 116 is positioned at an angle near 90° angle relative to the second channel 124.

As previously mentioned, the purpose of the bonding layer 104 is to facilitate coupling of the molded layer 106 to the sealing body 102. For example, the molded layer 106 may be formed by molding the second TPV onto the bonding layer 104. During molding, the second TPV chemically bonds with the first TPV of the bonding layer 104. By virtue of the bond that forms between the first and the second TPV, the molded layer 106 is directly bonded to the bonding layer 104, which is directly bonded to the sealing body 102.

In this way, the bonding layer 104 acts as a tie layer to couple the molded layer 106 to the overmold region 122 of the sealing body 102. Additionally, since the bonding layer 104 is only disposed on the overmold region 122, the bonding layer 104 (acting as a tie layer) is entirely sandwiched between the sealing body 102 and the molded layer 106 along the overmold region 122.

The second TPV of the molded layer 106 may be selected from any suitable molding-grade TPV, non-limiting examples of which include TPVs of the SANTOPRENE® 111, 121, 151, 211, 8211, 8221, 8223, 8271, and 8281 families available from Exxon-Mobil Corporation (Irving, Tex.). Non-limiting examples of suitable TPVs that are molding-grade that may be used as the second TPV of the molded layer 106 include SANTOPRENE® 111-35, SANTOPRENE® 111-45, SANTOPRENE® 121-50M100, SANTOPRENE® 121-55W241, SANTOPRENE® 121-60M100, SANTOPRENE® 121-60M200, SANTOPRENE® 121-65B200, SANTOPRENE® 121-65M300, SANTOPRENE® 121-70B230, SANTOPRENE® 121-70M350, SANTOPRENE® 121-75M100, SANTOPRENE® 121-75M200, SANTOPRENE® 121-79W233, SANTOPRENE® 121-80B200, SANTOPRENE® 121-80B230, SANTOPRENE® 121-80M300, SANTOPRENE® 121-85M100, SANTOPRENE® 151-70W256, SANTOPRENE® 211-45, SANTOPRENE® 8211-35, SANTOPRENE® 8211-45, SANTOPRENE® 8211-55, SANTOPRENE® 8211-65, SANTOPRENE® 8211-75, SANTOPRENE® 8211-85M350, SANTOPRENE® 8211-55M300, SANTOPRENE® 8221-55M300, SANTOPRENE® 8221-60, SANTOPRENE® 8221-65M300, SANTOPRENE® 8221-70, SANTOPRENE® 8221-75M300, SANTOPRENE® 8221-85M300, SANTOPRENE® 8223-30M300, SANTOPRENE® 8271-55, SANTOPRENE® 8271-65, SANTOPRENE® 8271-75, SANTOPRENE® 8281-35MED, SANTOPRENE® 8281-45MED, SANTOPRENE® 8281-55MED, SANTOPRENE® 8281-65MED, SANTOPRENE® 8281-75MED, and SANTOPRENE® 8281-90MED, all available from Exxon-Mobil Corporation (Irving, Tex.).

The second TPV may also be selected from any suitable TPV that is considered an extrusion-grade TPV and a molding-grade TPV, non-limiting examples of which include various TPVs of the GEOLAST® 701 and 703 families and various TPVs of the SANTOPRENE® 101, 103, 121, 123, 201, 203, 241, 251, 291, 8191, 8201, and 8211, all of which are available from Exxon-Mobil Corporation (Irving, Tex.). Specific non-limiting examples of TPVs which are extrusion-grade and molding-grade TPVs are set forth above.

In an example, the first TPV of the bonding layer 104 is different from the second TPV of the molded layer 106. For instance, the first TPV of the bonding layer 104 is selected from a extrusion-grade TPV and the second TPV of the molded layer 106 is selected from a molding-grade TPV. In another example, the first TPV of the bonding layer 104 is the same as the second TPV of the molded layer 106. For instance, both the first and second TPVs may be selected from the same TPV which is both an extrusion-grade and a molding-grade TPV.

In an example, and as shown, the sealing assembly 100 further comprises a carrier 126. The carrier 126 is a reinforcing member which provides rigidity and/or stability to the sealing assembly 10. As shown, the carrier 126 is disposed within the sealing body 102. Said differently, the carrier 126 is entirely encapsulated by the sealing body 102. In an example, the carrier 126 may be co-extruded with the sealing body 102 and the bonding layer 104. For example, during the extrusion process, the carrier 126 may be placed inside the extruder, and the EPDM rubber of the sealing body 102 may be extruded over the carrier 126. Typically, the EPDM rubber is extruded over all surfaces of the carrier 126, thereby entirely encapsulating the carrier 126. In an example, the carrier 126 comprises a metal, a non-limiting example of which is steel such as carbon steel, a steel alloy, a stainless steel, a tool steel, and a coated steel. Further, the carrier 126 may comprise an electro-galvanized steel or a mild steel. Alternatively, the carrier 126 may comprise aluminum or an aluminum alloy. It is to be understood that the carrier 126 may comprise any suitable material that will suitably provide rigidity and/or stability to the sealing assembly 100.

Figure 4:
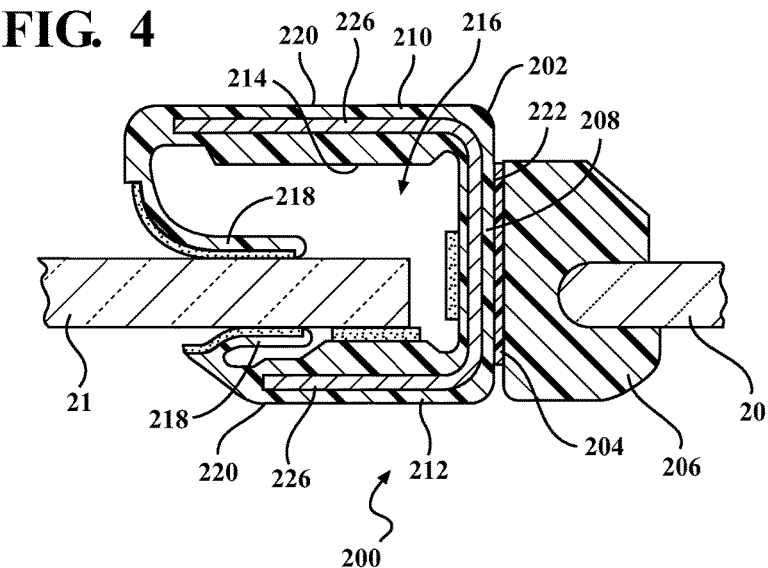
FIG. 4 is a cross-sectional view of the sealing assembly taken along line 4-4 in FIG. 1.
Figure 5:
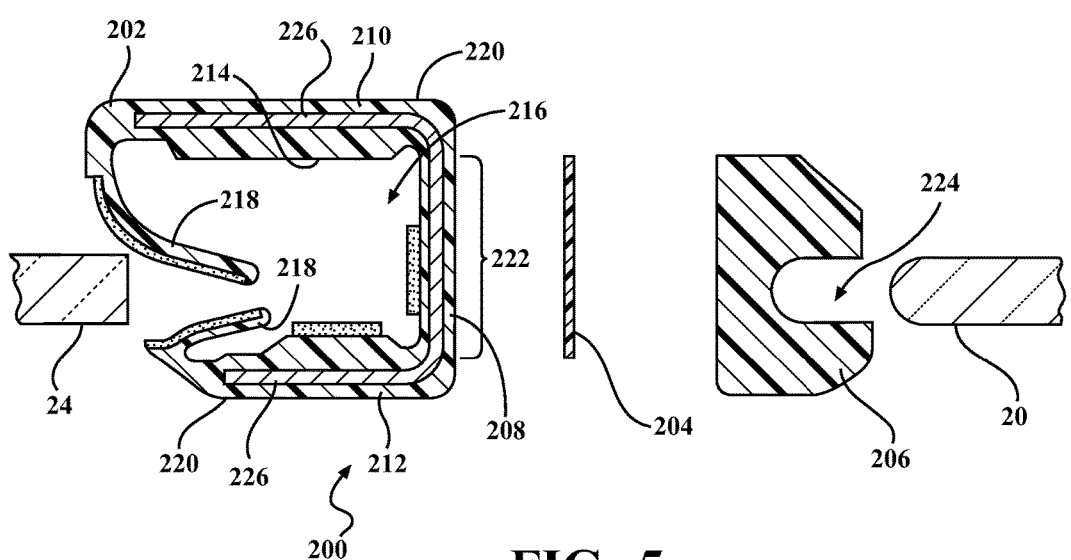
FIG. 5 is an exploded view of the sealing assembly of FIG. 4.

Another embodiment of the sealing assembly 200 is described below with reference to FIGS. 4 and 5. In an example, an edge of the moveable window 21 is received within and engaged by the sealing assembly 200. The fixed window 20 is also engaged by the sealing assembly 200. The sealing assembly 200 thereby forms a seal between the moveable window 21 and the fixed window 20. As such, the sealing assembly 200 defines the divider 22.

The sealing assembly 200 comprises a sealing body 202 extruded from an elastomeric material formed from EPDM (e.g., EPDM rubber), a bonding layer 204 of a first TPV co-extruded onto the sealing body 202, and a molded layer 206 of a second TPV molded onto the bonding layer 204. The sealing assembly 200 extends along a longitudinal axis B, which is typically linear. However, the longitudinal axis B (as shown in FIG. 1) may be nonlinear in instances where the sealing assembly 200 bends or flexes.

The sealing body 202 of the sealing assembly 200 has a base 208 and first 210 and second 212 legs spaced from one another extending from the base 208. In an example, and as shown, the first 210 and second 212 legs are substantially parallel to one another. The first 210 and second 212 legs are also transverse to the base 208. The base 208, the first leg 210, and the second leg 212 define an interior surface 214 and a first channel 216 for receiving a panel of the vehicle 10, such as the moveable window 21, within the first channel 216. In an example, the first channel 216 is substantially "U" shaped and extends along the longitudinal axis B. It is to be understood, however, that the first channel 216 may alternatively have any suitable shape.

The sealing body 202 further comprises at least one sealing lip 218 defined in the interior surface 214 of each of the first 210 and second 212 legs. Further, each of the sealing lips 218 extends toward the first channel 216. As shown, one sealing lip 218 is defined in the interior surface 214 of the first leg 210 at the end of the first leg 210, and one sealing lip 218 is defined in the interior surface 214 of the second leg 212 at the end of the second leg 212. It is to be understood that the interior surface 214 of each of the first 210 and second 212 legs may have more than one sealing lip 218, such as two, three, or more sealing lips 218. The sealing lips 218 can move or flex to allow the moveable window 21 of the vehicle door 14 to be received within the first channel 216. The sealing lips 218 are also biased toward the first channel 216 and toward one another so that when the window 21 is received within the first channel 216, the sealing lips 218 seals the edge of the moveable window 21.

The base 208 and the first 210 and second 212 legs of the sealing body 202 further define an exterior surface 220 opposite the interior surface 214. The exterior surface 220 is also opposite the first channel 216. Further, the sealing body 202 defines an overmold region 222 opposite the first channel 216 extending along a portion of the exterior surface 220 of the sealing body 202. The overmold region 222 is an area of the exterior surface 220 of the sealing body 202 to which the molded layer 206 is coupled to the sealing body 202. In an example, the overmold region 222 is a predefined area of the exterior surface 220 of the sealing body 202 to which the molded layer 206 is coupled to the sealing body 202. In the present embodiment, the overmold region 222 only extends along at least a portion of the base 208.

As previously mentioned, the sealing body 202 is extruded from an elastomeric material of the sealing body 202 formed from an ethylene propylene diene monomer (EPDM). In an example, the sealing body 202 is extruded from only the elastomeric formed from EPDM. In another example, the sealing body 202 is extruded from a composition including the elastomeric material and a plasticizer, a filler, and/or various other components or additives. It is to be understood that the sealing body 202 may be extruded from an elastomeric material formed from a monomer other than EPDM. For example, the sealing body 202 may be extruded from styrene butadiene rubber (SBR), natural rubber, neoprene, and/or combinations thereof. It is to be further understood that the sealing body 202 may be extruded from other materials, such as other thermoplastic or thermosetting materials, which are not specifically described herein.

The bonding layer 204 is of a first thermoplastic vulcanizate (TPV) co-extruded onto the overmold region 222 of the sealing body 202. As described in detail above with reference to the embodiment shown in FIGS. 2 and 3, the bonding layer 204 is used in the sealing assembly 200 to facilitate coupling of the molded layer 206 to the sealing body 202, and may be referred to as a tie layer. To this end, the bonding layer 204 need only be disposed on the overmold region 122.

The first TPV of the bonding layer 204 may be selected from any suitable extrusion-grade TPV or may be selected from any suitable extrusion-grade and molding-grade TPV. Non-limiting examples of extrusion-grade TPVs and extrusion-grade and molding grade TPVs for the first TPV are set forth above. Further, in an example, the first TPV may be a combination of a thermoplastic material and an elastomer. Non-limiting examples of elastomers that may be included with the first TPV are also set forth above. Additionally, the first TPV can include a plasticizer, a filler, and/or various other components or additives.

As previously described with reference to the embodiment shown in FIGS. 2 and 3, the sealing body 202 is formed by extruding the elastomeric material in an extruder, typically at an extrusion temperature suitable for melting and extruding EPDM rubber. During extrusion, the EPDM rubber of the sealing assembly 202 chemically bonds to the first TPV of the bonding layer 204. In addition to the chemical bond, the bonding layer 204 may also form a mechanical bond with the sealing body 202. For example, while the first TPV is in the molten state during co-extrusion, the molten first TPV may merge with the molten EPDM rubber of the sealing body 202 at the interface between the bonding layer 204 and the sealing body 202. After the materials merge, and after the bonding layer 204 and the sealing body 202 are removed from the extruder and cooled, the first TPV of the bonding layer 204 may also be mechanically held and/or fastened to the EPDM rubber of the sealing body 202.

The sealing assembly 100 further comprises the molded layer 206 of a second TPV molded onto the bonding layer 204. As shown, the molded layer 206 defines a second channel 224 for receiving the fixed window 20 of the vehicle 10 within the second channel 224. As shown, at least a portion of the first channel 216 is substantially parallel to the second channel 224. In an example, the first channel 116 is substantially parallel to the second channel 224 when the first channel 216 is positioned at a 0° or 180° angle relative to the second channel 224, or the first channel 216 is positioned at an angle near 0° or near 180° relative to the second channel 224.

As previously mentioned, the purpose of the bonding layer 204 is to facilitate coupling of the molded layer 206 to the sealing body 202. For example, the molded layer 206 may be formed by molding the second TPV onto the bonding layer 204. As previously described, during molding, the second TPV chemically bonds with the first TPV of the bonding layer 204. By virtue of the bond that forms between the first and the second TPV, the molded layer 206 is directly bonded to the bonding layer 204, which is directly bonded to the sealing body 202. In this way, the bonding layer 204 acts as a tie layer to couple the molded layer 206 to the overmold region 222 of the sealing body 202. Additionally, since the bonding layer 204 is only disposed on the overmold region 222, the bonding layer 204 (acting as a tie layer) is entirely sandwiched between the sealing body 202 and the molded layer 206 along the overmold region 222.

In an example, the first TPV of the bonding layer 204 is different from the second TPV of the molded layer 206. For instance, the first TPV of the bonding layer 204 is selected from a extrusion-grade TPV and the second TPV of the molded layer 206 is selected from a molding-grade TPV. In another example, the first TPV of the bonding layer 204 is the same as the second TPV of the molded layer 206. For instance, both the first and second TPVs may be selected from the same TPV which is both an extrusion-grade and a molding-grade TPV.

In an example, and as shown, the sealing assembly 200 further comprises a carrier 226. The carrier 226 is a reinforcing member which provides rigidity and/or stability to the sealing assembly 200. As shown, the carrier 226 is disposed within the sealing body 202. Said differently, the carrier 226 is entirely encapsulated by the sealing body 202. In an example, the carrier 226 may be co-extruded with the sealing body 202 and the bonding layer 204. For example, during the extrusion process, the carrier 226 may be placed inside the extruder, and the EPDM rubber of the sealing body 202 may be extruded over the carrier 226. Typically, the EPDM rubber is extruded over all surfaces of the carrier 226, thereby entirely encapsulating the carrier 226. In an example, the carrier 226 comprises a metal, a non-limiting example of which is steel such as carbon steel, a steel alloy, a stainless steel, a tool steel, and a coated steel. Further, the carrier 226 may comprise an electro-galvanized steel or a mild steel. Alternatively, the carrier 226 may comprise aluminum or an aluminum alloy. It is to be understood that the carrier 226 may comprise any suitable material that will suitably provide rigidity and/or stability to the sealing assembly 200.

Figure 6:
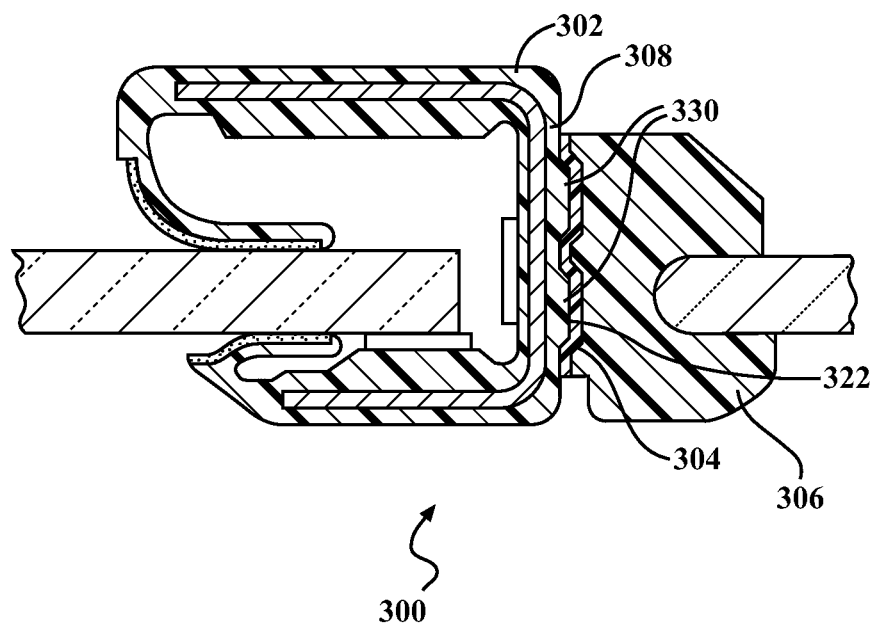
FIG. 6 is a cross-sectional view of another embodiment of the sealing assembly for a vehicle.

Another embodiment of the sealing assembly 300 is shown in FIG. 6. The sealing assembly 300 in this embodiment is similar to the sealing assembly 200, except that the base 308 of the sealing body 302 has at least one raised portion 330 on the overmold region 322, and the bonding layer 304 is co-extruded over the raised portion(s) 330. The raised portion(s) 330 are incorporated in this embodiment for purposes of increasing the surface contact area for bonding purposes. For example, with the raised portion(s) 330, there is a larger surface contact area for the bonding layer 304, which in turn creates a larger bonding area of the molded layer 306 bonded to the bonding layer 304.

Also disclosed herein is a method of manufacturing the sealing assembly 100, 200, 300 for the vehicle 10 having a fixed window 20 and a panel, such as the moveable window 21 and/or the rear panel 24. While the method of manufacturing is applicable for each of the sealing assemblies 100, 200, 300, the method is described below with reference to the sealing assembly 100 shown in FIGS. 2 and 3.

The method comprises extruding an elastomeric material formed from EPDM to form the sealing body 102 having the base 108 and the first 110 and second 112 legs spaced from one another extending from the base 108. The base 108 and the first 110 and second 112 legs define the interior surface 114 and the first channel 116 for receiving the panel (e.g., the rear panel 24) within the first channel 116. The base 108 and the first 110 and second 112 legs further define the exterior surface 120 opposite the interior surface 114. The sealing body 102 defines the overmold region 122 opposite the first channel 116 extending along a portion of the exterior surface 120 of the sealing body 102. The sealing body 102 may be extruded by extruding the EPDM rubber utilizing any suitable extruder, typically at an extrusion temperature of from 50 to 150° C. At this temperature, the EPDM rubber suitably melts and extrudes into the preset shape of the sealing body 102.

In instances where a carrier 126 is used, the carrier 126 may be placed into the extruder and the carrier 126 is co-extruded with the EPDM rubber such that the carrier 126 is encapsulated by the sealing body 102.

The method further comprises co-extruding the first TPV onto the overmold region 122 of the sealing body 102 to form the bonding layer 104 on the overmold region 122. For example, the first TPV is extruded onto the overmold region 122 of the sealing body 102 while the sealing body 102 is still inside the extruder and while the sealing body 102 is still hot. As described in detail above, when the first TPV is co-extruded onto the overmold region 122, the first TPV melts to at least one of mechanically bond or chemically bond the bonding layer 104 of the first TPV to the sealing body 102 of the EPDM rubber.

After the bonding layer 104 has been co-extruded onto the overmold region 122 of the sealing body 102, the method further includes removing the sealing body 102 of EDPM with the bonding layer 104 of the first TPV from the extruder. Once removed, the extrudate (i.e., the sealing body 102 of EDPM with the bonding layer 104 of the first TPV) is allowed to cool and normalize. Then, the method includes molding the second TPV onto the bonding layer 104 to form the molded layer 106 with the molded layer 106 defining the second channel 124 for receiving the fixed window 20 of the vehicle 10 within the second channel 124. Since the first TPV is co-extruded only on the overmold region 122, when the molded layer 106 is molded onto the bonding layer 104, the bonding layer 104 is entirely sandwiched between the sealing body 102 and the molded layer 106. In an example, the second TPV is molded onto the bonding layer 104 to form the molded layer 106 by injection molding. Alternatively, the second TPV may be molded onto the bonding layer 104 utilizing any suitable molding process.

The sealing assembly 100 has been described above as forming a seal between the first side frame member 18 and the rear panel 24 of the vehicle 10 and between the fixed window 20 and the first side frame member 18, and the sealing assembly 200, 300 has been described above as forming a seal between the moveable window 21 and the divider 19, and forms a seal between the divider 19 and the fixed window 20. It is to be understood that the sealing assembly 100, 200, 300 may be utilizes for sealing other openings defined in the vehicle 10, such as trunk openings, door openings, sunroof openings, etc. It should also be appreciated that the sealing assembly 100, 200, 300 may also be used for other purposes that are not specifically related to vehicles and are not specifically described herein.

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all examples falling within the scope of the appended claims.

What is claimed is:

1. A sealing assembly for a vehicle having a fixed window and a panel, said sealing assembly comprising:
   a sealing body extruded from an elastomeric material formed from an ethylene propylene diene monomer (EPDM) with said sealing body having a base and first and second legs spaced from one another extending from said base with said base and said first and second legs defining an interior surface and a first channel for receiving the panel within said first channel, and said base and said first and second legs further defining an exterior surface opposite said interior surface with said sealing body defining an overmold region opposite said first channel extending along a portion of said exterior surface of said sealing body;
   a bonding layer of a first thermoplastic vulcanizate (TPV) co-extruded onto said overmold region of said sealing body; and
   a molded layer of a second thermoplastic vulcanizate (TPV) molded onto said bonding layer with said second TPV of said molding layer bonded to said first TPV of said bonding layer to attach said molded layer to said sealing body, with said molded layer remaining spaced from said sealing body by said bonding layer along said overmold region and defining a second channel for receiving the fixed window of the vehicle within said second channel.

2. The sealing assembly as set forth in claim 1 wherein said bonding layer of said first thermoplastic vulcanizate (TPV) is at least one of mechanically bonded or chemically bonded to said elastomeric material of said sealing body.

3. The sealing assembly as set forth in claim 1 wherein said bonding layer is only disposed on said overmold region such that said bonding layer is entirely sandwiched between said sealing body and said molded layer along said overmold region.

4. The sealing assembly as set forth in claim 1 wherein said overmold region extends along said base and a portion of said second leg of said sealing body.

5. The sealing assembly as set forth in claim 1 wherein said overmold region only extends along said base.

6. The sealing assembly as set forth in claim 1 wherein said sealing body has at least one raised portion on said overmold region and said bonding layer is co-extruded over said raised portion.

7. The sealing assembly as set forth in claim 1 wherein said first TPV is different from said second TPV.

8. The sealing assembly as set forth in claim 1 further comprising a carrier and said sealing body is extruded over said carrier.

9. The sealing assembly as set forth in claim 8 wherein said carrier comprises a metal.

10. The sealing assembly as set forth in claim 8 wherein said carrier is entirely encapsulated by said sealing body and is co-extruded with said sealing body and said bonding layer.

11. The sealing assembly as set forth in claim 1 wherein said first and second legs are substantially parallel to one another and said first and second legs are transverse to said base.

12. The sealing assembly as set forth in claim 1 wherein at least a portion of said first channel is substantially perpendicular to said second channel.

13. The sealing assembly as set forth in claim 1 wherein at least a portion of said first channel is substantially parallel to said second channel.

14. The sealing assembly as set forth in claim 1 wherein said sealing body further comprises at least one sealing lip defined in said interior surface of each of said first and second legs and extending toward said first channel.

15. A method of manufacturing a sealing assembly for a vehicle having a fixed window and a panel, said method comprising the steps of:

extruding an elastomeric material formed from an ethylene propylene diene monomer (EPDM) to form a sealing body having a base and first and second legs spaced from one another extending from the base with the base and the first and second legs defining an interior surface and a first channel for receiving the panel within the first channel, and the base and the first and second legs further defining an exterior surface opposite the interior surface with the sealing body defining an overmold region opposite the first channel extending along a portion of the exterior surface of the sealing body;

co-extruding a first thermoplastic vulcanizate (TPV) onto the overmold region of the sealing body to form a bonding layer on the overmold region; and molding a second thermoplastic vulcanizate (TPV) onto the bonding layer to form a molded layer with the molded layer defining a second channel for receiving the fixed window of the vehicle within the second channel.

16. The method as set forth in claim 15 wherein the step of co-extruding the first TPV onto the overmold region is further defined as melting the first TPV to at least one of mechanically bond or chemically bond the bonding layer of first TPV to the sealing body of EPDM.

17. The method as set forth in claim 15 wherein the steps of extruding the EPDM and co-extruding the first TPV each occur at an extrusion temperature of from 100 to 150° C.

18. The method as set forth in claim 15 further including a carrier, and further including the step of co-extruding the carrier with the EPDM such that the carrier is encapsulated by the sealing body.

19. The method as set forth in claim 15 further including an extruder and further including the step of removing the sealing body of EPDM with the bonding layer of the first TPV from the extruder prior to said step of molding the second TPV onto the bonding layer.

20. The method as set forth in claim 15 wherein the step of molding the second TPV onto the bonding layer is further defined as injection molding the second TPV onto the bonding layer to form the molded layer defining the second channel for receiving the fixed window of the vehicle.

21. The method as set forth in claim 15 wherein the step of co-extruding the first TPV onto the overmold region is further defined as co-extruding the second TPV only on the overmold region such that the bonding layer is entirely sandwiched between the sealing body and the molded layer.

* * * * *